United States Patent [19]
Griffith

[11] 3,764,814
[45] Oct. 9, 1973

[54] CONTROL FOR AUXILIARY POWER UNIT

[75] Inventor: James J. Griffith, East Granby, Conn.

[73] Assignee: United Aircraft Corporation, East Hartford, Conn.

[22] Filed: Mar. 27, 1972

[21] Appl. No.: 238,214

[52] U.S. Cl. .................. 290/40, 290/2, 60/39.16, 417/408
[51] Int. Cl. .................................. H02p 9/04
[58] Field of Search ................. 60/39.16, 39.25; 290/40, 2; 417/408, 409, 406

[56] References Cited
UNITED STATES PATENTS

| | | |
|---|---|---|
| 3,686,860 | 8/1972 | White .......................... 60/39.25 |
| 3,625,003 | 12/1971 | Liddle .......................... 60/39.25 |
| 3,678,285 | 7/1972 | Griffith .......................... 290/40 |
| 3,308,618 | 3/1967 | Jubb et al. .................... 60/39.25 |
| 3,546,879 | 12/1970 | Hass ............................ 60/39.16 |
| 3,488,947 | 1/1970 | Miller et al. .................. 60/39.16 |
| 3,237,404 | 3/1966 | Flanagan et al. ............. 60/39.16 |
| 3,104,524 | 9/1963 | Flanders ....................... 60/39.16 |

Primary Examiner—G. R. Simmons
Attorney—Norman Friedland

[57] ABSTRACT

A control for a free turbine type of power plant utilized as an auxiliary power unit for aircraft generating electricity, supplying pneumatics and/or hydraulic pressure, maintains turbine speed at a constant value by modulaing engine power and compressor load independently of each other.

8 Claims, 2 Drawing Figures

$K_P, \frac{K_I}{S}, K_B =$ STANDARD LAPLACE
$N_1 =$ SPEED OF GAS GENERATOR (RPM)
$N_2 =$ SPEED OF FREE TURBINE (RPM)
$W_f =$ FUEL FLOW
IGV = INLET GUIDE VANES PATENTED OCT 9 1973　　　3,764,814
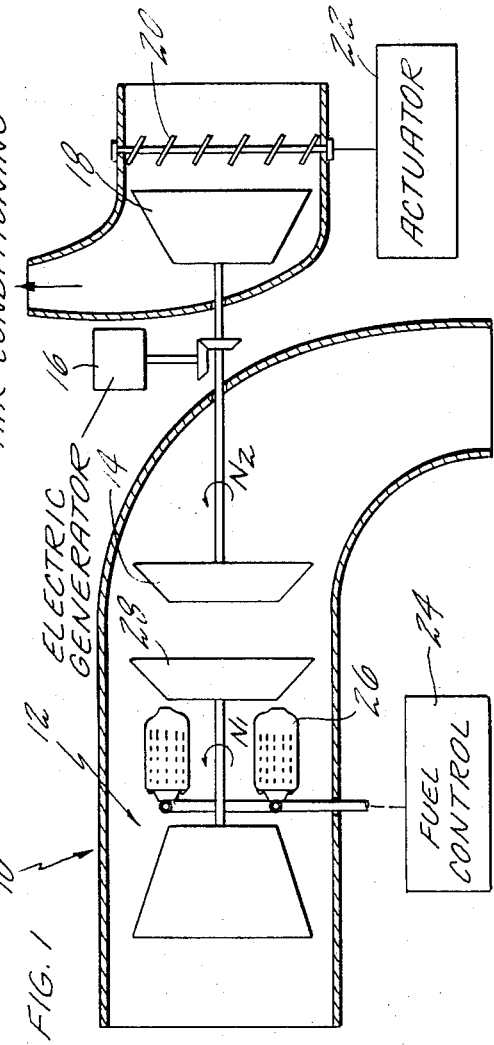
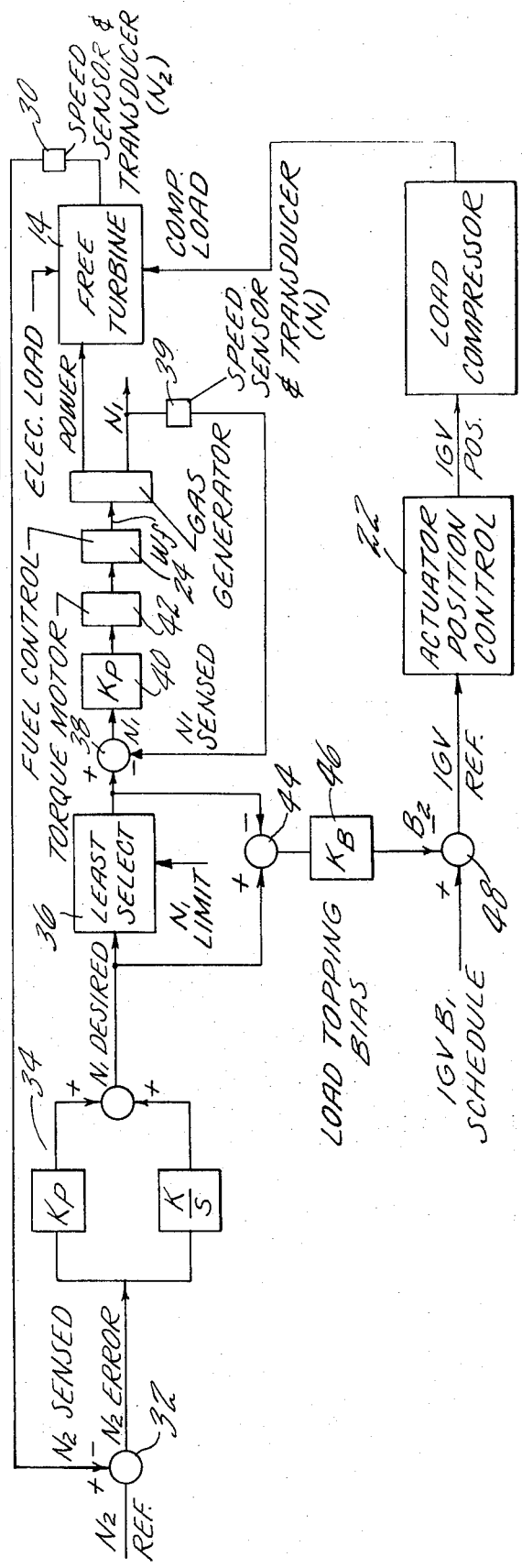

CONTROL FOR AUXILIARY POWER UNIT

BACKGROUND OF THE INVENTION

This invention relates to auxiliary power units (APU) of the type that utilizes a free turbine type of power plant and particularly to means for maintaining the frequency of the electrical alternator driven by the APU at a predetermined constant value for all load conditions.

Heretofore, it has been customary to obtain power for the electrical, pneumatics and/or hydraulic systems by utilizing the main propulsor of the aircraft. With the advent of wide body aircraft a separate jet engine is utilized as the APU and this invention is particularly efficacious when the APU is a free turbine type of jet engine. As is apparent the APU serves to provide electrical, pneumatic and/or hydraulic power for the numerous systems in the aircraft. Thus, in this particular system the APU drives an alternator to generate electricity for the electronic and electrical equipment and a load compressor to pressurize ambient air for the air conditioning system.

As is well known it is abundantly important in aircraft systems that the frequency of the alternator be maintained at a constant value. In this particular APU it is important that the free turbine must be held at a constant speed for all load conditions. While it would be possible to utilize an auxiliary power unit that provides sufficient power over the entire operating range irrespective of the power requirement of all of the separate systems, such a unit would not only be larger and heavier than would be required for normal operation, but obviously would be more expensive.

Accordingly, the purpose of this invention is to maintain a constant free turbine speed to assure that the electrical frequency requirements for all free turbine loads is maintained in preference to the load requirements of all of the other systems. The power developed by the power plant is limited to the temperature that is within the structural integrity of the engine components and therefore the control limits gas generator speed to maximum power conditions in order to prevent over temperature. Thus the power plant is sized for normal operating conditions, but in peak load conditions the pneumatic load is decreased in preference to the electrical load so that the constant frequency of the alternator is always maintained.

To achieve this end I found that I can provide in a control that maintains constant free turbine speed for electrical frequency requirements for all free turbine loads, limit the gas generator speed to maximum power conditions in order to prevent over temperature of the engine and reduce the pneumatic load in precedence to electrical load in order to assure that the electrical load is always satisfied, by controlling engine power and load compressor independently of each other in such a manner that neither function interact with each other. Thus, only one control mode is operating at one time and the transition of one load to another is smooth and continuous requiring no switching logic.

SUMMARY OF THE INVENTION

It is a primary object of this invention to provide an improved control system for an auxiliary power unit for an aircraft.

A still further object of this invention is to provide an auxiliary power control that includes means for independently controlling the power output of the gas generator and the load compressor so that each unit is controlling independently of each other.

A still further object of this invention is to provide for an auxiliary power unit as described means for maintaining the free turbine of an APU at a constant value by adjusting the fuel flow to the gas turbine as a function of free turbine speed to maintain the power requirement within the maximum temperature limit and modulating the load to the load compressor whenever the limit has been reached in order to maintain constant electrical frequency for all load conditions.

A still further object of this invention is to provide in a control for an APU as described a least select circuit that biases the load compressor inlet guide vanes control to modulate the pneumatic load whenever gas generator speed reaches the maximum limit. This indirectly limits turbine temperature and maximum power.

Other features and advantages will be apparent from the specification and claims and from the accompanying drawings which illustrate an embodiment of the invention.

BRIEF DESCRIPTION OF THE DRAWING

FIG. 1 is a schematic of a free turbine jet engine driving the load compressor and electric generator.

FIG. 2 is a block diagram representation of a control in accordance with this invention.

DESCRIPTION OF THE PREFERRED EMBODIMENT

Reference is now made to FIG. 1 which schematically illustrates the APU as comprising a free turbine type of power plant generally illustrated by numeral 10 having a gas generating or power producing section 12 (compressor, burner and turbine) a free turbine 14 driving an electrical generator or alternator 16 and a load compressor 18. A suitable free turbine type of power plant may be the PT-6 manufactured by United Aircraft of Canada, Limited. The load compressor 18 serves to pressurized ambient or ram air for supplying the air conditioning packages which in turn serve to control the pressurization and temperature in the aircraft cabin and compartments. Variable inlet guide vanes 20 movable by the actuator illustrated by the blank box 22 vary the area at the inlet of the compressor in order to vary the pneumatic load on load compressor 18. A suitable fuel control illustrated by blank box 24 serves to control the fuel to the burners 26 in a well known manner in order to develop the necessary power for driving the free turbine 14. It will be noted that there are no mechanical connections between the free turbine 14 and the gas generator turbine 28 and its only connection being the gaseous connection from the gas generating turbine hence the term "free." A suitable fuel control may be the JFC-46, JFC-60 or a host of other fuel controls manufactured by the Hamilton Standard Division of United Aircraft Corporation. Inasmuch as the detailed description of the fuel control, transduces, torque motor, the power plant, the actuators, air conditioning package, electrical generator and the electronic control components and circuits is not necessary for an understanding of this invention they are not included here for the sake of clarity and simplicity. These elements are all well known in the art and the particular ones utilized is not pertinent to the scope of the invention.

As can be seen in FIG. 2 the APU control is shown in schematic and simplified form and serves to maintain the free turbine at a constant speed. A suitable speed transducer 30 senses the speed of the free turbine ($N_2$) and converts it to a voltage which is proportional thereto which is applied to the comparator 32. A voltage indicative of the required speed of the free turbine ($N_2$ ref) is impressed on comparator 32 where it is compared with the actual $N_2$ to generate a signal indicative of the difference ($N_2$ error). The $N_2$ error signal is applied to the proportional plus integral control 34 which generates a signal in terms of $N_1$ desired, i.e. the necessary change in $N_1$ to obtain the constant $N_2$. This signal is applied to the least select circuit 36. The $N_1$ desired signal generated by the proportional plus integral control is continuously compared with the $N_1$ over temperature limit signal. While the value of the $N_1$ over temperature limit signal may vary with the aircraft operating variables such as altitude, temperature and/or pressure for the purpose of this invention it can be assumed that this value is fixed.

The closed loop circuit of the $N_1$ control serves to separate the gas generator 12 so that the power by the various output loads matches the power developed thereby. So long as the $N_1$ desired is less than $N_1$ limit, comparator 38 comparing the actual speed of the gas generator by transducer 39 (similar to transducer 36) with the desired gas generator speed ($N_1$ desired) produces an $N_1$ error signal indicative of any difference. This error, ($N_1$ error) is then fed to proportional control 40 for generating a current signal for actuating torque motor 42 (a proportional solenoid could also be used) in a well known manner which in turn controls the fuel control 24 for varying fuel flow ($W_f$) to the gas generator 12 for varying the power produced thereby.

As is apparent from the foregoing, whenever $N_1$ desired is less than the $N_1$ limit, the signal to the low topping biased comparator 44 will be zero since the input and output of the least select circuit 36 is the same. However, should the $N_1$ desired signal call for more power (by requiring a higher speed) than the $N_1$ limit indicates that the power plant can produce without incurring an over temperature condition the input to the $N_1$ desired to the least select 36 will be greater than its $N_1$ output producing an error signal in comparator 44. Comparator 44 passes this signal to the load topping bias controller 46 which in turn impresses a signal (a voltage converted to a IGV value) in the inlet guide vanes (IGV) comparator 48. For the purpose of this invention it is only necessary to understand that the inlet guide vanes are scheduled in accordance with a predetermined schedule which may be a function of a control parameter such as aircraft cabin temperature which scheduled value is fed to the actuator position control 22 in order to modulate the inlet guide vanes to change the flow of air into the load compressor 18 and hence its load. In the $N_1$ limit condition, described immediately above, the proportional load topping bias control 46 biases the IGV schedule in order to modulate the guide vanes to reduce the load on the free turbine 14 independently of the power control of the engine and reduce the $N_2$ error to zero. Thus, if the air conditioning package is demanding more power than what the gas generator can produce in order to remain within the gas generator speed limit this pneumatic load will be reduced so that the alternator 16 will maintain a constant frequency assuring that the free turbine will not become overloaded and deviate from the constant speed value.

It should be understood that the invention is not limited to the particular embodiments shown and described herein, but that various changes and modifications may be made without departing from the spirit or scope of this novel concept as defined by the following claims.

I claim:

1. A speed control for an auxiliary power unit for aircraft where said auxiliary power unit includes a free turbine power plant driving an electrical alternator and a load compressor supplying compressed air to an air conditioning system, means for varying the air admitted to the load compressor for controlling the load thereon, said speed control having means including a fuel control for modulating power of the plant power and means including an actuator for controlling said air varying means independently of said power plant power for maintaining the speed of the said free turbine at a constant value.

2. A speed control for an auxiliary power unit driving a load compressor and an electrical alternator where the auxiliary power unit is a free turbine power plant having a gas generator and the load compressor includes means for varying the loads on the load compressor, said speed control having means for controlling the speed of the gas generator to produce sufficient power to drive the alternator and load compressor for predetermined load conditions, means for limiting the speed of the gas generator to prevent an over temperature power plant condition, and means independent of said gas generator control means for controlling said load varying means of the load compressor to modulate the power absorbed by the load compressor whenever the gas generator control means demands more speed called for by said limiting means to permit the free turbine to operate at a constant speed whereby the said alternator maintains constant frequency at all load conditions of the free turbine.

3. A speed control as claimed in claim 2 wherein said speed control includes a first means responsive to free turbine speed and a fixed speed reference for providing a first signal indicative of any difference therebetween, a second means responsive to the speed of said gas generator for producing a second signal indicative of the difference between said first signal and said speed of said gas generator, and means responsive to said second signal for changing the power output of said gas generator.

4. A speed control as claimed in claim 3 including variable area valve means at the inlet of said load compressor for controlling the flow of fluid admitted thereto varying the load on said load compressor.

5. A speed control as claimed in claim 4 including a least select control comparing said first signal with the limiting means for producing a third signal indicative of the difference.

6. A speed control as claimed in claim 5 including means for scheduling the load on said compressor by adjusting said variable area valve means and means responsive to said third signal to bias said scheduling means.

7. A speed control as claimed in claim 6 including means for obtaining a proportional and integral signal of said first signal.

8. A speed control for an auxiliary power unit for aircraft where said auxiliary power unit includes a free turbine power plant driving an electrical alternator and a load compressor supplying compressed air to an air conditioning system, means for varying the air admitted to the load compressor for controlling the load thereon, said speed control having means including a fuel control for modulating power of the power plant, means including an actuator for controlling said air varying means independently of said power plant power control means for maintaining the speed of the said free turbine at a constant value, said speed control including a torque motor responsive to the difference between gas generator desired speed and free turbine actual speed, means for producing a gas generator desired speed including a proportional plus integral control responsive to the difference between a fixed speed free turbine value and the actual free turbine speed, a least select control responsive to said desired free turbine speed and a precalculated gas generator speed that would cause over temperature if exceeded to produce a signal indicative of said excessed value, means for scheduling said actuator with a predetermined schedule, and means responsive to said signal for biasing said scheduling means.

* * * * *